Patented July 7, 1936

2,046,833

UNITED STATES PATENT OFFICE 2,046,833

TABLETS OF PURE DEXTROSE

Heinrich Meyer, Barby-Elbe, Germany, assignor to International Patents Development Company, Wilmington, Del., a corporation of Delaware No Drawing. Application January 28, 1935, Serial No. 3,881. In Germany May 26, 1933

1 Claim. (Cl. 127—30)

This invention relates to tablets composed of dextrose or starch sugar, and to a method of producing the same.

More recently pure dextrose has been adopted for medicinal purposes, particularly in the treatment of fluor albus. This sugar, however, is not particularly suitable in the ordinary powder form obtainable on the market, for which reason it is desirable to press the same beforehand into tablets. If, however, pure anhydrous dextrose is pressed into tablets in the usual fashion, with or without the addition of, say 1% starch and a small quantity of talc, these tablets will break up only very slowly when moistened, which naturally represents a disadvantage in their use.

Now the surprising discovery has been made that tablets, which will break up very readily when moistened with water, but nevertheless are sufficiently firm in the dry state, may be obtained from pure dextrose, with or without the addition of the usual binding agents (starch or talc), when using for this purpose pure dextrose containing 1 molecule water of crystallization. The tablets may be produced without moistening the powder in any way. It is naturally also possible to make use of the ordinary pure dextrose obtainable on the market, which is more or less devoid of crystalline water, this being converted into the desired condition prior to the production of the tablets.

To assist the breaking up of the tablets when moistened with water, and also to facilitate their use generally, the surface of the tablets is preferably made large in relation to the volume, which may conveniently be performed by making the tablets of elongated form, rounded at either end.

Tests made with elongated tablets of equal size, approximately 5 cm. in length and 2 cm. in diameter, show that those made of pure dextrose containing water of crystallization are completely dissolved after being in water for approximately 2 to 3 minutes, whereas tablets made from the same dextrose which, however, has been made anhydrous, still retain their form after one hour. By pure crystalline dextrose is meant dextrose crystallized from a dextrose solution and purged of its mother liquor so that it is substantially free from the non-dextrose substances contained in the usual starch converted dextrose solutions. Obviously the tablets might carry or contain other drug or drugs which it might be desired to incorporate with the dextrose.

What I claim as new and desire to secure by Letters Patent is:

Pure crystalline dextrose containing 1 molecule of water of crystallization and compressed into coherent and stable tablets capable of being rapidly broken up and dissolved in water.

HEINRICH MEYER.